Figures 1, 2:
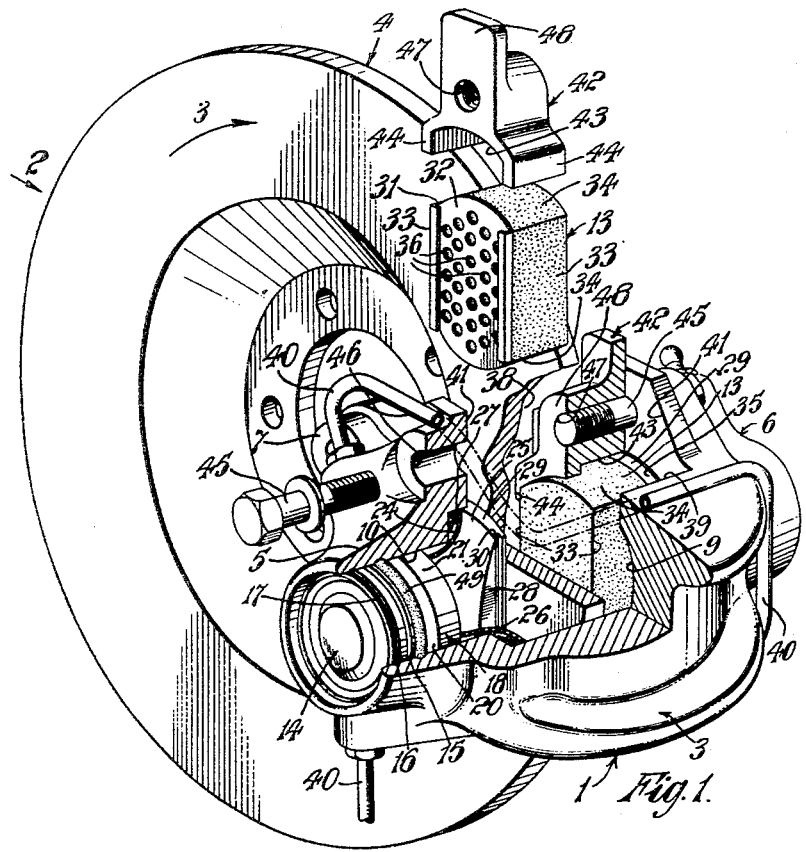

June 28, 1960 H. J. BUTLER 2,942,695

SPOT BRAKE WITH REMOVABLE FRICTION PADS

Filed March 25, 1958

INVENTOR
Henry James Butler
Benj. T. Rauber
his attorney

United States Patent Office 2,942,695
Patented June 28, 1960

2,942,695

SPOT BRAKE WITH REMOVABLE FRICTION PADS

Henry James Butler, Sutton Coldfield, England, assignor to Dunlop Rubber Company Limited, London, England, a British company Filed Mar. 25, 1958, Ser. No. 723,722

Claims priority, application Great Britain Apr. 1, 1957

14 Claims. (Cl. 188—73)

This invention relates to disc brakes and is an improvement in, or modification of, the disc brake forming the subject-matter of U.S. application Serial No. 455,828, filed September 14, 1954, now Patent No. 2,921,650, dated January 19, 1960.

In the above patent I have described a disc brake comprising a rotatable disc, a non-rotatable bracket located adjacent the outer periphery of the disc, two pad-retaining members extending radially inwardly from each end of the bracket in circumferentially-spaced relation, a pad of friction material adjacent each side of the disc and an actuating mechanism for forcing the pads of friction material into frictional contact with the sides of the disc. The braket is so constructed that a portion may be removed to permit removal of the friction pads and associated pressure plates without dismantling the brake.

The above brake is particularly adapted for use in heavy vehicles such as railway rolling stock, and also in industrial machinery, wherein provision can be made for suitably anchoring the bracket which, as shown in the drawings of the above specification, is substantially of the cantilever type.

The present invention provides improvements in, and modifications of, the above brake which will render the brake more readily adaptable for use over a wider range of applications.

According to the present invention, therefore, a disc brake comprises an annular rotatable disc, a non-rotatable housing comprising a limb extending adjacent each radial surface of said disc, each limb comprising a fluid-pressure mechanism operable to force an associated friction pad into frictional engagement with said disc, means associated with each said limb to prevent movement of said friction pads in either tangential direction relative to said disc when the brake is applied, said means including means detachable from each said limb to permit removal and insertion of said friction pads in one said tangential direction.

Preferably said fluid-pressure operated means comprises a cylinder formed integrally in each said limb coaxially of a passage in which a friction pad is adapted to slide upon actuation of a piston slidable within said cylinder. Preferably, also, said piston is flared outwardly at the end thereof adjacent the associated friction pads, and this flared portion is truncated at opposite ends of a diameter to form two parallel chordal flat surfaces which are engaged by side flanges protruding from the rear of the friction pad. These flanges are preferably formed on a backing plate to which the friction pad is secured and have inturned portions adapted to be engaged in co-operating grooves formed in the chordal truncations of the end of the piston so that the friction pad is constrained to move axially in unison with the piston but may be detached therefrom or secured thereto by relative movement therebetween in a direction parallel to the plane of the disc and tangential thereto.

Preferably the detachable means permitting removal and replacement of the friction pads in a tangential direction comprises a portion of the peripheral wall of the pasage in each limb.

But a better understanding of the invention may be obtained from the following description of a preferred form thereof, when this is read with reference to the accompanying drawings, of which:

Figure 1 is a perspective part-sectioned and partly exploded view of a brake assembly according to the invention; and Figure 2 is a view, partly in section, taken in the direction of the arrow 2 of Figure 1.

As shown in the drawings, and particularly in Figure 1 thereof, the brake comprises a housing 1 which is of generally U-shape, the base 3 of the U extending axially adjacent the outer periphery of a rotatable disc 4, and the two arms or limbs 5 and 6 extending radially-inwardly of opposite radial sides of the disc 4 in parallel-spaced relation thereto. The limb 5 is of greater radial length than the limb 6 and at its radially-inner extremity is formed with a pair of circumferentially-spaced ears 7 which are adapted to be secured to a non-rotatable portion of a vehicle or other device.

Co-axial passages are formed axially through each limb 5 and 6, and each of these passages comprises a large diameter portion 9 (Fig. 2) on the side of the limb adjacent the disc 4 and a smaller diameter portion 10 on the axially-outer side of each limb, the portions 9 and 10 being co-axial with each other.

The portions of the larger diameter bore 9, one on each side of the disc, are each provided with a radially-inturned rim 12 which provides an arcuate ledge extending radially into the bore portion 9 to provide a support and guide for the friction pads 13, later to be described. This rim 12 is shown in Figure 2 as being on the radially-lowermost side of the housing 1 when the housing is assembled in association with the disc 4. This position is subject to some variation in accordance with the positioning of the housing 1 relative to the disc 4 and with the normal direction of rotation of the disc 4 as shown by the arrow 3 of Figure 1, and is preferably orientated in relation to the disc 4 so that it is squarely presented to the normal direction of rotation of the disc, on the trailing side of the housing (i.e., the rear side of the housing relative to said rotation) for a reason which will be obvious as this description proceeds.

A closure member 14, fitted with an annular sealing ring 15, is secured in the axially-outer end of each bore portion 10 by means of a circular spring clip 16 which is received in an annular groove in the outer end of the bore 10 and in an annular recess in the outer periphery of the closure member 14, the adjacent end portion 17 of the closure member 14 being peened over the spring clip 16, to lock the closure member 14 in the bore 10, when the respective parts are initially positioned.

With the closure member 14 in position, the bore 10 becomes a cylinder, by which name it will be identified henceforth in the following description, and in this cylinder 10 a piston 18 is fluid-tightly slidable.

The piston 18 is a cylindrical member comprising a small diameter portion 19 lying adjacent the inner face of the closure member 14. On the disc side of the portion 19 is formed an annular groove in which is located the inner periphery of the sealing ring 20 which forms a fluid-tight seal between the piston 18 and the wall of the cylinder 10 and is supported on the disc side thereof by a large diameter cylindrical portion 21 of the piston, which portion is a snug sliding fit in the cylinder 10.

On the disc side of the portion 21 the piston is again reduced in diameter to a further cylindrical portion 22 (Figure 2) which is of substantially the same diameter as the portion 19 and is axially separated from the portion 21 by an annular recess 23 into which is inserted the inner peripheral bead of an annular flexible frusto-conical diaphragm 24 which is disposed with its concave side facing towards the disc 4.

The portion 22 of the piston 18 is then flared radially outwardly into a large diameter portion 25 which is located within the bore portion 9 and is freely slidable therewithin between the annular step 26 formed at the junction of the cylinder 10 and the bore portion 9 and the inner radial face of the rim 12. The outer peripheral bead 27 of the diaphragm 24 is located between the step 26 and the flared portion 25 of the piston 18 and provides a dirt and moisture seal for the cylinder 10.

The flared end 25 of the piston 18 is truncated at each end of one diameter thereof to provide a pair of diametrically-opposed parallel flat surfaces 28 on chords thereof, and two diametrically-opposed arcuate surfaces 29 comprising the periphery of the flared portion 25, the surfaces 29 being co-axial of the piston 18, and being loosely slidable within the bore portion 9.

A groove 30 is formed down each flat surface 28 parallel with, and adjacent the radial surface of the end of the flared portion 25, and into the groove 30 is adapted to be slid, transversely of the portion 25, the radially-inturned hook-like flanges 31 of a flat backing plate 32 to which is secured a friction pad 13. The backing plate 32 and friction pad 13 are of substantially the same shape and dimensions in plan, and comprise, in the friction pad 13, two diametrically-opposed parallel flat sides 33 which coincide in radial width with the flat surfaces 28 of the piston 18, and two diametrically-opposed arcuate ends 34 the diameter of which is somewhat less than the diameter across the corresponding arcuate surfaces 29 of the piston 18. Thus, when the pad 13 and backing plate 32 are diametrically centered on the end of the piston 18 two diametrically-opposed portions 35 of the flared end 25 of the piston 18, and comprising the arcuate ends 29 of the base of the piston, protrude beyond each arcuate end 34 of the friction pad 13 and backing plate 32.

The friction pad 13 is secured to the backing plate 32 by any known suitable means, such as by adhesives, by bonding, by moulding in situ, or the like, and the backing plate may be perforated as at 36 to reduce the heat transfer to the piston when the brake is applied. As the friction pads 13 are supported in shear by the rim 12 and a further rim 37, later to be described, it is not necessary for the bond between the backing plate and friction pad to be such as to withstand any great shearing stresses.

One circumferential side of each bore 9 is cut away to form an aperture extending to the outside of the respective limbs 5 and 6, substantially tangentially of the disc 4 and diametrically-opposite the rim 12, and is bounded by radially-spaced parallel walls 38, 39 each of which lies tangentially of the disc 4.

The closure member 14, piston 18 and diaphragm 24 are inserted into each cylinder 10 and the housing 1 is then assembled in relation to the disc 4 and the pressure-fluid conduits 40 are suitably connected to the cylinders 10 and a source of fluid-pressure (not shown) in the known manner. The pistons 18 are orientated in the cylinders 10 so that the flat surfaces 28 lie substantially parallel to a tangent of the disc 4 and one portion 35 of each piston 18 lies behind the arcuate rim 12 within each bore 9.

The pistons 18 are then pressed fully into the cylinders 10 so that the grooves 30 just protrude beyond the inner faces 41 of the limbs 5 and 6, the flanges 31 of the backing plates 32 are engaged with the grooves 30 and the backing plates 32 and associated friction pads 13 are pressed into the spaces between the walls 38 and 39 of the limbs 5 and 6 of the U-shaped housing 1; the flanges 31 sliding in the grooves 30 until the radially-inner arcuate ends 34 of the pads 13 engage the arcuate surfaces of the rims 12.

To support the friction pads 20 against dislodgement during braking when the vehicle is in reverse, a yoke member 42 is provided to comprise a removable guide and support for each pad 13. Each yoke 42 comprises an arcuate recessed portion 43, which, when the yoke 42 is in its position in the housing, comprises a circumferential continuation of the bore portion 9. At one end of the recess 43 there is provided the previously-mentioned radial rim portion 37 which, when the yoke 42 is in position, lies diametrically-opposite, and in co-axial symmetry with, the rim 12 and thus provides a guide support for the opposite arcuate surface 34 of the pad 13. The circumferentially-spaced ends of the recess 43 are bounded by parallel lips 44, which when the yoke 42 is inserted into the housing, pass between the walls 38 and 39, of the limbs 5 and 6 of the U-shaped housing 1 to hold the piston 18 and friction pad 13 against rotation and to provide a rigid support for the yoke 42, which is detachably secured to the limb 5 or 6 by a bolt 45 which is passed axially inwardly through a hole 46 in the limb 5 or 6, and is engaged with a screw thread in a hole 47 in the shank 48 of the yoke 42.

In the operation of the brake, pressure-fluid is passed through the conduits 40 by actuation of a suitable fluid-pressure actuator such as a known type of master cylinder or, in the case of a constantly-pressurised system as known in the art, by actuation of a suitable fluid valve.

Fluid-pressure is thus built up in the annular spaces 49 in the cylinders 10, between the closure member 14 and the piston sealing rings 20, and the pistons 18 are moved axially in the cylinders 10 towards the disc 4, forcing the friction pads 13 into frictional engagement therewith. The arcuate ends 34 of the pads 13 slide between the rims 12 and 37 and the torque forces produced by braking are thus transferred to the rim 12 or 37 which lies on the side of the housing 1 away from which the disc 4 is rotating.

As the pads 13 wear away through continued application of the brake the piston 18 progresses gradually down the cylinder 10 towards the disc 4, and the flared portion 25 similarly moves in the bore portion 9 until, upon application of the brake, the arcuate projections 35 come into abutment with the adjacent faces of the rims 12 and 37 and no further movement of the pads 13 towards the disc 4 is possible.

The pads 13 then require to be renewed, and the only operations that are needed to do this are the removal of the bolts 45 and yokes 42 and the sliding of the backing plates 32 and associated pad remnants out of the grooves 30 in a direction tangential of the disc 4. The pistons 18 are then pressed back into the cylinders 10 until the grooves 30 just protrude beyond the surfaces 44 and another backing plate 32 and pad 20 is then slid into each pair of grooves 30, the yokes 42 being then replaced as previously described.

By providing means permitting the pads 13 to be removed tangentially of the disc 4 it is possible to produce a brake having readily-replaceable friction pads without it being necessary to reduce the axial width of the base member 1, and thereby to increase the bending moment of this member under braking loads.

Having now described my invention what I claim is:

1. A disc brake comprising a disc, a U-shaped housing having the base of the U extending axially adjacent the outer periphery of the disc and its limbs extending radially inwards on opposite sides of the discs, each limb having a cylinder bore formed therein, a separate and separable yoke secured to each limb of the housing and defining with said limb a pair of guides located respectively on opposite sides of a radius of said disc, a piston in each bore, a friction pad assembly in each pair of guides, and means for connecting each said assembly to the adjacent piston for axial movement of the connected piston and assembly together, said means enabling the assembly to be withdrawn from the connected piston tangentially of the disc when the respective yoke is separated from the housing.

2. A disc brake as claimed in claim 1 wherein said pistons each have an enlarged head located adjacent the disc, each head having parallel grooved edges, and said assemblies each include a backing plate having parallel hooked flanges which engage in said grooved edges.

3. A disc brake as claimed in claim 2 wherein each of said assemblies consists of a pad of frictional material of the same shape as the backing plate, and the latter is perforated to minimize heat transfer from the pad to the adjacent piston.

4. A disc brake as claimed in claim 1 wherein each pad assembly has two flat sides parallel to a tangent of the disc, and convex ends.

5. A disc brake as claimed in claim 4 wherein the guide surface in each limb and in each yoke is so shaped and located that said ends of each assembly and end portions of the flat sides of each assembly are slidably engaged with said guide surfaces.

6. A disc brake as claimed in claim 1 wherein each yoke fits between the associated limb and the disc and has a tapped hole which registers with a plain hole in said limb, and a bolt extending through each plain hole is secured into said tapped hole to detachably secure the yoke to the limb.

7. A disc brake as claimed in claim 1 wherein the guide surfaces of the limbs and yokes are formed by the peripheries of radially extending lips located adjacent the disc.

8. A disc brake comprising an annular rotatable disc, a non-rotatable housing embracing a part of said disc and having a limb on each side of said disc extending from a part of the housing beyond the rim of the disc toward the center of the disc, each limb having a friction pad receiving recess extending axially from the face of the limb opposite a radial face of the disc and having a slot extending from said recess and open to said face, a friction pad in each friction pad receiving recess, an operating means on each limb acting on its respective friction pad to move the pad to frictional engagement with said disc, said recess and said yoke having guiding surfaces to abut the axially extending surfaces of the friction pad for guiding said friction pad axially as it moves to and from said disc and to support it against movement transverse to said axial movement.

9. The brake disc of claim 8 in which said slot extends in a direction transverse to a radius of said disc.

10. The brake disc of claim 8 in which said operating means comprises a fluid operated means coaxial with said recess to move a friction pad toward said disc.

11. The brake disc of claim 8 in which said operating means comprises a cylinder and piston in said limb axially aligned with said recess, said piston extending into said recess to engage said friction pad.

12. The brake disc of claim 11 in which said piston has grooves to engage a friction pad assembly and extending in the direction of said slot.

13. The disc brake of claim 8 in which said yoke has a pair of arms to receive a portion of a brake pad and a pad guiding surface between said arms.

14. The disc brake of claim 8 having a screw extending through said limb into engagement with said yoke.

References Cited in the file of this patent

UNITED STATES PATENTS

| | | |
|---|---|---|
| 2,799,367 | Dotto | July 16, 1957 |
| 2,820,530 | Chouings et al. | Jan. 21, 1958 |

FOREIGN PATENTS

| | | |
|---|---|---|
| 1,117,453 | France | Mar. 23, 1956 |
| 738,545 | Great Britain | Oct. 12, 1955 |